3,019,208
METHOD OF MAKING GRAFT COPOLYMERS OF VINYL CHLORIDE AND POLYACRYLATE
Robert J. Reid, Canal Fulton, and Chris E. Best, Franklin Township, Summit County, Ohio, assignors to The Firestone Tire & Rubber Company, Akron, Ohio, a corporation of Ohio
No Drawing. Filed Jan. 18, 1954, Ser. No. 404,806
6 Claims. (Cl. 260—45.5)

This invention relates to the production of graft copolymers by grafting a vinyl resin (composed of either vinyl chloride or a mixture of vinyl chloride and a comonomer) onto an acrylate polymer. The polyacrylate is first polymerized in an emulsion, and then without separation of the polyacrylate from the emulsion the vinyl resin is polymerized onto it.

Acrylate polymer and vinyl polymer or copolymer are normally incompatible. The graft copolymer is a compatible composition in which the acrylate acts as a plasticizer for the polyvinyl chloride or copolymer.

Monomeric plasticizers have been used with vinyl polymers and copolymers, but their usefulness is limited because of the ease with which they are separated from the vinyl composition. They are quite volatile, bleed, and to some extent are removed by solvents such as soapy water, etc. They have become known as fugitive plasticizers. The need for a non-fugitive plasticizer for vinyl resins has long been recognized. Polymeric plasticizers have been employed which in general have lower vapor pressure than the monomeric materials and are less apt to migrate. However, no polymeric material has been found to be entirely satisfactory. Butadiene-acrylonitrile copolymers which have been used as plasticizers are subject to oxidative attack at the double bond. Soft, saturated polymers such as polyacrylates and polyvinyl methyl ketone are not sufficiently compatible with the vinyl compositions to be entirely satisfactory. Furthermore, in general, vinyl compositions containing polymeric plasticizers have rather poor low-temperature properties.

According to this invention vinyl compositions are plasticized by utilizing them in the form of graft copolymers in which vinyl chloride with or without a comonomer is polymerized onto an acrylate polymer base. The graft copolymer must contain a substantial amount of the polyacrylate in order to have a beneficial effect on the vinyl composition, and normally will comprise substantially 10 to 50 percent by weight of the graft copolymer. The polyacrylate imparts flexibility and softness to the vinyl composition, making it desirable for such products as shower curtains, shower caps, table covers, rainwear, etc. Thus the vinyl composition is internally plasticized eliminating the need of added plasticizer or significantly reducing the amount of such plasticizer required. The products may be made by casting or extruding, or calendering the graft copolymer. The graft copolymer may be used in the form of a solution or latex.

The polyacrylates which may be used in carrying out the invention are alkyl esters in which the alkyl group contains up to 10 carbon atoms. Ordinarily the butyl ester will be employed. The esters of the lower alcohols do not impart as much flexibility to the vinyl composition as the butyl ester, for example. Where the higher esters are used the graft polymerization does not appear to be as efficient, the amount being bound to the acrylate being the measure of the efficiency.

Ordinarily the graft copolymer will be formed with vinyl chloride without admixture with a comonomer. The graft copolymer has a lower softening point than polyvinyl chloride, and in this respect and other respects has of itself properties which were obtained by copolymerizing comonomers with vinyl chloride. Certain special properties are obtained by using various copolymerizable monoethylenically unsaturated comonomers with the vinyl chloride, and in producing the graft copolymer up to 10 or 15 percent of such comonomers may be used, such as for example vinyl acetate, vinylidene chloride, trichlorethylene, etc. The term "vinyl chloride resin" will be used herein generally to include polyvinylchloride and copolymers of vinyl chloride with small amounts of comonomers which are often employed in making copolymers with vinyl chloride.

The graft copolymerization process is carried out in latex. Vinyl chloride with or without a small amount of other suitable monomer is added to a previously prepared latex of polyacrylate. Additional catalyst and emulsifying agent, such as soap, etc., may be added but are not required. This mixture is then subjected to polymerizing conditions; for example, by stirring at a suitable temperature which may be as low as 20° C. or even lower although rates of reaction are slow at such temperatures and ordinarily temperatures of 30° to 60° or even up to 70° C. or higher will be used. Higher temperatures may be employed more successfully with vinyl chloride than with mixtures of vinyl chloride and a comonomer. The higher temperatures are preferred because they not only speed up the reaction, but also give a vinyl resin of lower molecular weight. Higher temperatures also increase the efficiency of the grafting process. The resulting latex may be used as such, or the graft copolymer may be isolated by conventional methods.

Molded compositions obtained from the graft copolymer are clear and tough, whereas a mixture of a polyacrylate and vinyl resin, separately prepared, will not be compatible and will not give transparent products. They will be relatively cheesy.

The graft copolymers are suitable for fabrication by extrusion, calendering, and molding. The latexes themselves and solutions of the graft copolymer may likewise be used. The graft copolymers do not have the strength generally required for filaments.

The invention is illustrated by the following examples in which the polymerization of the acrylate is designated Step A, and the polymerization of the vinyl resin thereon is designated Step B.

*Example I*

Step A.—A latex of ethyl polyacrylate was prepared by charging the following materials into a crown-capped bottle:

100 g. ethyl acrylate
425 g. water
0.6 g. potassium persulfate
1.75 g. sodium lauryl sulfate
0.2 g. sodium hydroxide The system was purged with nitrogen and the bottle was tumbled 2.5 hrs. at 67° C.

Step B.—A quantity of the latex resulting from the above polymerization containing 40 g. of ethyl polyacrylate was added to a mixture of 57 g. of vinyl chloride and 3 g. of vinylidene chloride. An additional 0.1 g. potassium persulfate was also added. The system was purged of air. Polymerization was essentially complete after 26 hours at 40° C. The polymer was isolated by coagulation with calcium chloride solution and dried at 40° C.

A plaque pressed from this graft copolymer at 170° C. was clear and tough whereas a mixture of ethyl polyacrylate and a vinyl/vinylidene chloride copolymer of similar over-all composition gave a cloudy plaque which was weak and cheesy and had poor tear strength. Furthermore, the graft copolymer gave a clear, homogeneous solution in tetrahydrofuran while the mixture of polymers gave a two-phase solution in this solvent. This was proof that the product referred to as a "graft copolymer" was not a mere mixture of the separate polymers.

*Example II*

A graft copolymer was prepared using the foregoing procedure, except that vinyl chloride was used in Step B instead of the mixture of vinyl chloride and vinylidene chloride.

The product was essentially the same as that obtained in Example I except that the fusion point was higher.

*Example III*

A graft copolymer of vinyl-vinylidene chloride on butyl polyacrylate was prepared in the same fashion as in Example I except that butyl acrylate was substituted for ethyl acrylate in Step A. The product obtained gave a softer, more flexible plaque than did the product of Example I. The product differed markedly from a mixture of butyl polyacrylate with a vinyl/vinylidene chloride copolymer in being clearer and tougher.

Similar experiments in which the amounts of polyacrylate and vinyl monomers were varied so as to give final compositions containing 20 and 30 percent of polyacrylate were carried out. These products differed from the corresponding mixtures of polymers in giving clearer, tougher plaques. As the acrylate content was reduced the stiffness of the products increased.

*Example IV*

The graft copolymer which appears to have preferred properties is the copolymer formed by polymerizing vinyl chloride (without comonomer) on butyl polyacrylate. Such graft copolymer may be produced by any suitable process, as for example by using the procedure of Example II, employing butyl acrylate instead of ethyl acrylate. In commercial operations higher temperatures than that set forth will ordinarily be employed. The product obtained in similar to that described in Example III except that the fusion point is somewhat higher.

Further tests indicate that a variety of emulsifying agents, including soap, may be used without affecting the graft copolymerization. It is possible to carry out Step B without use of additional catalyst. The amounts of emulsifying agent, catalyst, etc., the concentration of the latex, and the alkalinity of the reaction mixture may be varied over a considerable range as will be evident to anyone skilled in the art.

The graft copolymers are not as sensitive to temperature changes as simple copolymers of vinyl chloride with acrylates. This difference in sensitivity at high temperatures was established by hanging strips of the different materials weighted at their lower ends to give a pull of 84 pounds per square inch, and then gradually raising the temperature of the oven and noting the temperature at which each strip broke. The strips of the graft copolymers broke at temperatures substantially higher than temperatures at which strips of simple copolymers of similar composition broke. The sensitivity of the different materials at lower temperatures was measured by Young's modulus. The simple copolymers stiffened more quickly as the temperature was lowered than did the graft copolymers.

We claim:

1. The method of forming a graft copolymer of a vinyl resin and an alkyl polyacrylate which comprises emulsifying 50 to 90 parts of monomer from the class consisting of (a) vinyl chloride and (b) a mixture of vinyl chloride and up to 15 percent of a copolymerizable monoethylenically unsaturated monomer, in an aqueous emulsion of 50 to 10 parts of an already formed homopolymer of an alkyl ester of acrylic acid, the alkyl group of which contains 1 to 10 carbon atoms, and heating the resulting emulsion to 30 to 70° C. in the presence of potassium persulfate, as catalyst, and producing the graft copolymer.

2. The method of forming a graft copolymer which comprises emulsifying 50 to 90 parts of vinyl chloride in an aqueous emulsion of 50 to 10 parts of an already formed homopolymer of an alkyl ester of acrylic acid, the alkyl group of which contains 1 to 10 carbon atoms, and heating the resulting emulsion to 30 to 70° C. with potassium persulfate, as catalyst, and producing the graft copolymer.

3. The method of forming a graft copolymer which comprises emulsifying 50 to 90 parts of a mixture of vinyl chloride and up to 15 percent of copolymerizable monoethylenically unsaturated monomer, in an aqueous emulsion of 50 to 10 parts of an already formed homopolymer of an alkyl ester of acrylic acid, the alkyl group of which contains 1 to 10 carbon atoms, and heating the resulting emulsion to 30 to 70° C. with potassium persulfate, as catalyst, and producing the graft copolymer.

4. The method of forming a graft copolymer which comprises emulsifying 50 to 90 parts of vinyl chloride in an aqueous emulsion of 50 to 10 parts of poly butyl acrylate, and heating the resulting emulsion to 30 to 70° C. with potassium persulfate, as catalyst, and producing the graft copolymer.

5. The method of forming a graft copolymer which comprises emulsifying 50 to 90 parts of vinyl chloride in an aqueous emulsion of 50 to 10 parts of an already formed homopolymer of an alkyl ester of acrylic acid, the alkyl group of which contains 1 to 4 carbon atoms, and heating the resulting emulsion to 30 to 70° C. with potassium persulfate, as catalyst, and producing the graft copolymer.

6. The method of forming a graft copolymer which comprises emulsifying 50 to 90 parts of a mixture of vinyl chloride and up to 15 percent of a copolymerizable, monoethylenically unsaturated monomer in an aqueous emulsion of 50 to 10 parts of an already formed homopolymer of an alkyl ester of acrylic acid, the alkyl group of which contains 1 to 4 carbon atoms, and heating the resulting emulsion to 30 to 70° C. with potassium persulfate, as catalyst, and producing the graft copolymer.

References Cited in the file of this patent

UNITED STATES PATENTS

| | | |
|---|---|---|
| 2,155,590 | Garvey | Apr. 25, 1939 |
| 2,310,132 | Underdahl | Feb. 2, 1943 |
| 2,322,309 | Morgan et al. | June 22, 1943 |
| 2,657,191 | Coover et al. | Oct. 27, 1953 |

FOREIGN PATENTS

| | | |
|---|---|---|
| 574,804 | Great Britain | Jan. 22, 1946 |
| 627,265 | Great Britain | Aug. 4, 1949 |
| 679,562 | Great Britain | Sept. 17, 1952 |

OTHER REFERENCES

Carlin et al.: "Journal Am. Chem. Soc.," 68, 876, 878, May 1946.